(12) United States Patent
Kao

(10) Patent No.: US 6,415,588 B1
(45) Date of Patent: Jul. 9, 2002

(54) FOLDABLE POWER DRIVEN GARDENING DEVICE

(76) Inventor: Yang-Min Kao, No. 16, Lane 136, Chen-Ping Rd. Pei-Tun Dist., Taichung City (TW)

(*) Notice: Subject to any disclaimer, the term of this patent is extended or adjusted under 35 U.S.C. 154(b) by 0 days.

(21) Appl. No.: 09/828,929

(22) Filed: Apr. 10, 2001

(51) Int. Cl.[7] .............................................. A01D 67/00
(52) U.S. Cl. ...................................................... 56/16.7
(58) Field of Search ................................ 56/12.1, 12.4, 56/10.1, 1, 2, 16.7, 12.7, 12.8, 17.5, 17.2; 30/276; 280/47.24; 248/230.1, 230.9

(56) References Cited

U.S. PATENT DOCUMENTS

| | | | | |
|---|---|---|---|---|
| 5,613,354 A | * | 3/1997 | Foster | 56/16.7 |
| 5,771,670 A | * | 6/1998 | Perry | 56/12.1 |
| 5,829,236 A | * | 11/1998 | Ballard et al. | 56/16.7 |
| 5,884,462 A | * | 3/1999 | Gerber | 56/12.1 |
| 6,085,503 A | * | 7/2000 | Hutchinson | 56/12.7 |

* cited by examiner

Primary Examiner—Robert E. Pezzuto
(74) Attorney, Agent, or Firm—Sughrue Mion, PLLC

(57) ABSTRACT

A foldable power driven gardening device includes a wheel axle with two wheels, a support member mounted on the wheel axle to support a motor, a sleeve mount member sleeved on a coupling shaft of the motor which extends forwardly and downwardly from the motor for connection to a tool member, and a handle member pivoted to the sleeve mount member at a front end portion. A rear end portion of the handle member extends upwardly and rearwardly from the front end portion to terminate at a handgrip end, and is turnable between an operating position to place the handgrip end rearwardly of the wheels, and a folded position to place the handgrip end forwardly of the wheels and proximate to the tool member.

15 Claims, 8 Drawing Sheets

FOLDABLE POWER DRIVEN GARDENING DEVICE

BACKGROUND OF THE INVENTION

1. Field of the Invention

This invention relates to a power driven gardening device, more particularly to a foldable power driven gardening device with a handle member which is foldable relative to a support member of the gardening device.

2. Description of the Related Art

Referring to FIG. 1, a conventional power driven mower is shown to include a motor 101 with an output shaft (not shown), and a coupling shaft (not shown) which is received in a tubular sleeve 102 and which is connected to the output shaft at one end thereof, and which is connected to a cutter 103 at the other end thereof. A support frame 2 is disposed to support the motor 101, and is provided with a pair of wheels 201. A handle 3 is mounted detachably on, and extends upwardly and rearwardly from the support frame 2.

Referring to FIG. 2, a conventional tiller is shown to include a motor 101' which is supported by a support frame 2' and which has an output shaft (not shown) that is connected with a coupling shaft (not shown) received in a tubular sleeve 102'. The coupling shaft extends forwardly and downwardly to connect with a tool member 103'. A handle 3' is mounted detachably on, and extends upwardly and rearwardly from the support frame 2'. Although the handles 3,3' of these conventional gardening and agricultural tools can be detached from the support frames 2,2' for storing of the tools, reassembly of the handles 3,3' is a time-consuming and inconvenient process when it is desired to use the tools.

SUMMARY OF THE INVENTION

The object of the present invention is to provide a foldable power driven gardening device having a handle member which is foldable to facilitate storing of the same.

According to this invention, the foldable power driven gardening device includes a wheel axle which extends in a first axis, and which has two ends that are respectively provided with a pair of wheels thereon. A support member includes a lower portion which is secured relative to the wheel axle between the wheels, and an upper portion which extends upwardly and in a first direction transverse to the first axis from the lower portion. A motor has an output shaft and is supported on the upper portion of the support member. A coupling shaft is mounted to be rotatable relative to the support member, and has a first rear end portion which is coupled with and which is driven by the output shaft, and a first front end portion which extends from the first rear end portion in a second direction substantially transverse to both the first axis and the first direction to terminate at a coupling end. A sleeve mount member is sleeved on the first rear end portion to permit rotation of the first rear end portion relative thereto, and has a distal end portion which is connected securely to the support member, and a proximate end portion opposite to the distal end portion in the second direction. A tool member is mounted on and is driven by the coupling end. A handle member has a second front end portion which is secured to be pivotable relative to the proximate end portion of the sleeve mount member about a second axis parallel to the first axis, and a second rear end portion which extends upwardly and rearwardly from the second front end portion and which terminates at a handgrip end that extends rearwardly of the wheels. As such, the second rear end portion is turnable about the second axis between an operating position, where the handgrip end is placed rearwardly of the wheels, and a folded position, where the handgrip end is placed forwardly of the wheels and is proximate to the coupling end of the coupling shaft. A retaining member is disposed to retain the upper portion of the support member relative to the second rear end portion of the handle member when the second rear end portion is in the operating position.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
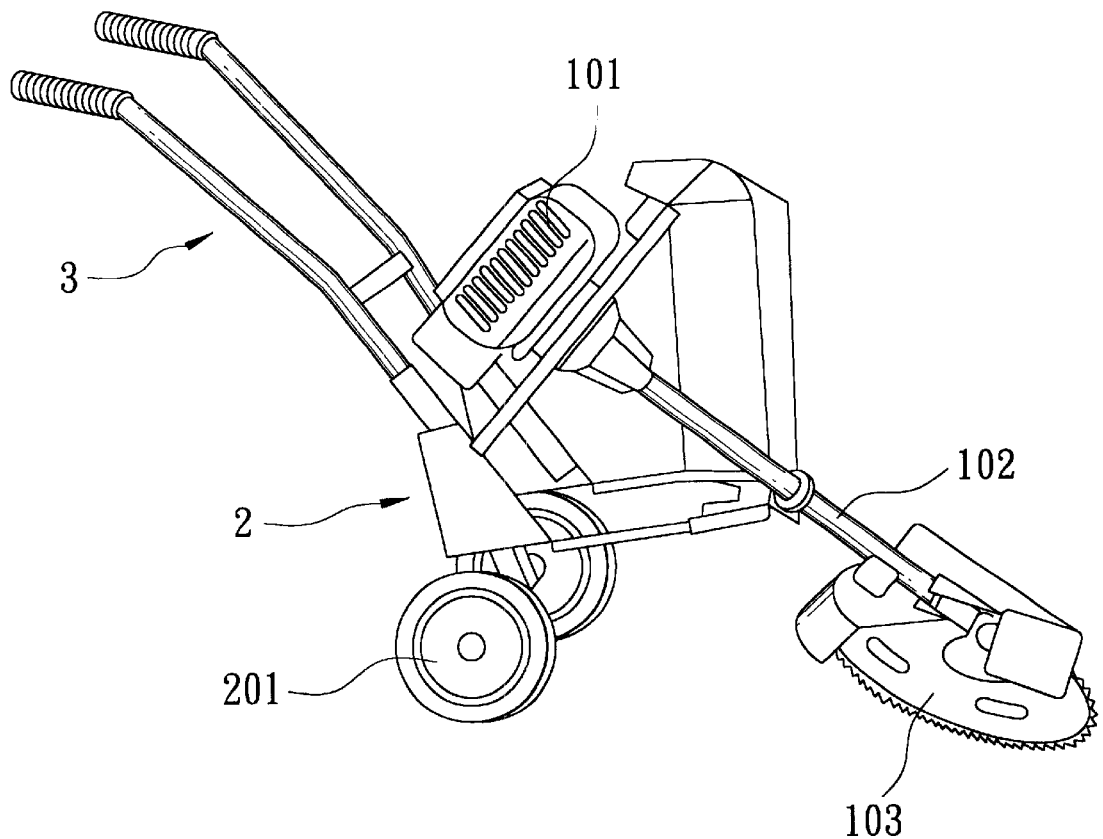
FIG. 1 is a side view of a conventional power driven mower.
Figure 2:
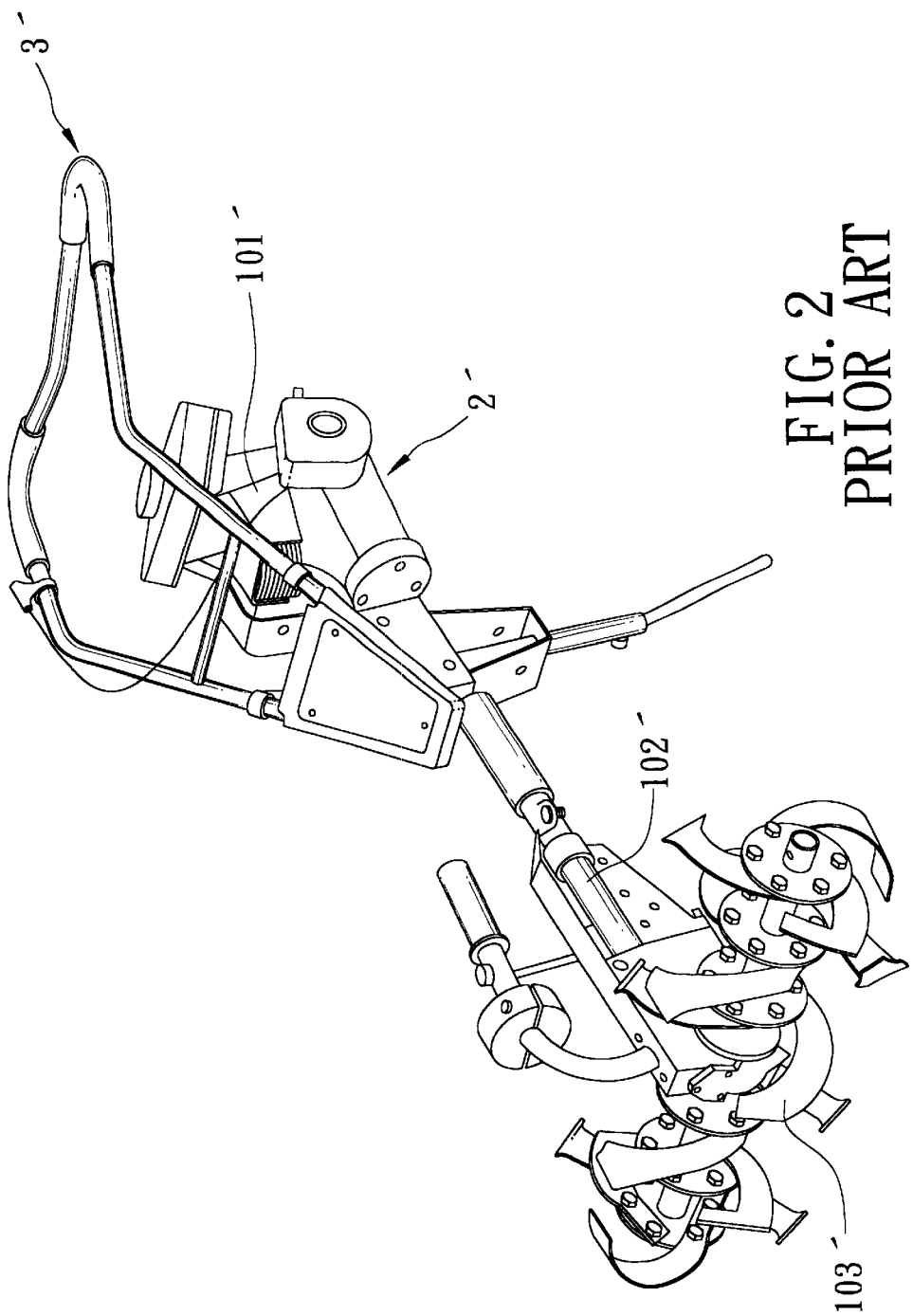
FIG. 2 is a perspective view of a conventional power driven tiller.
Figure 3:
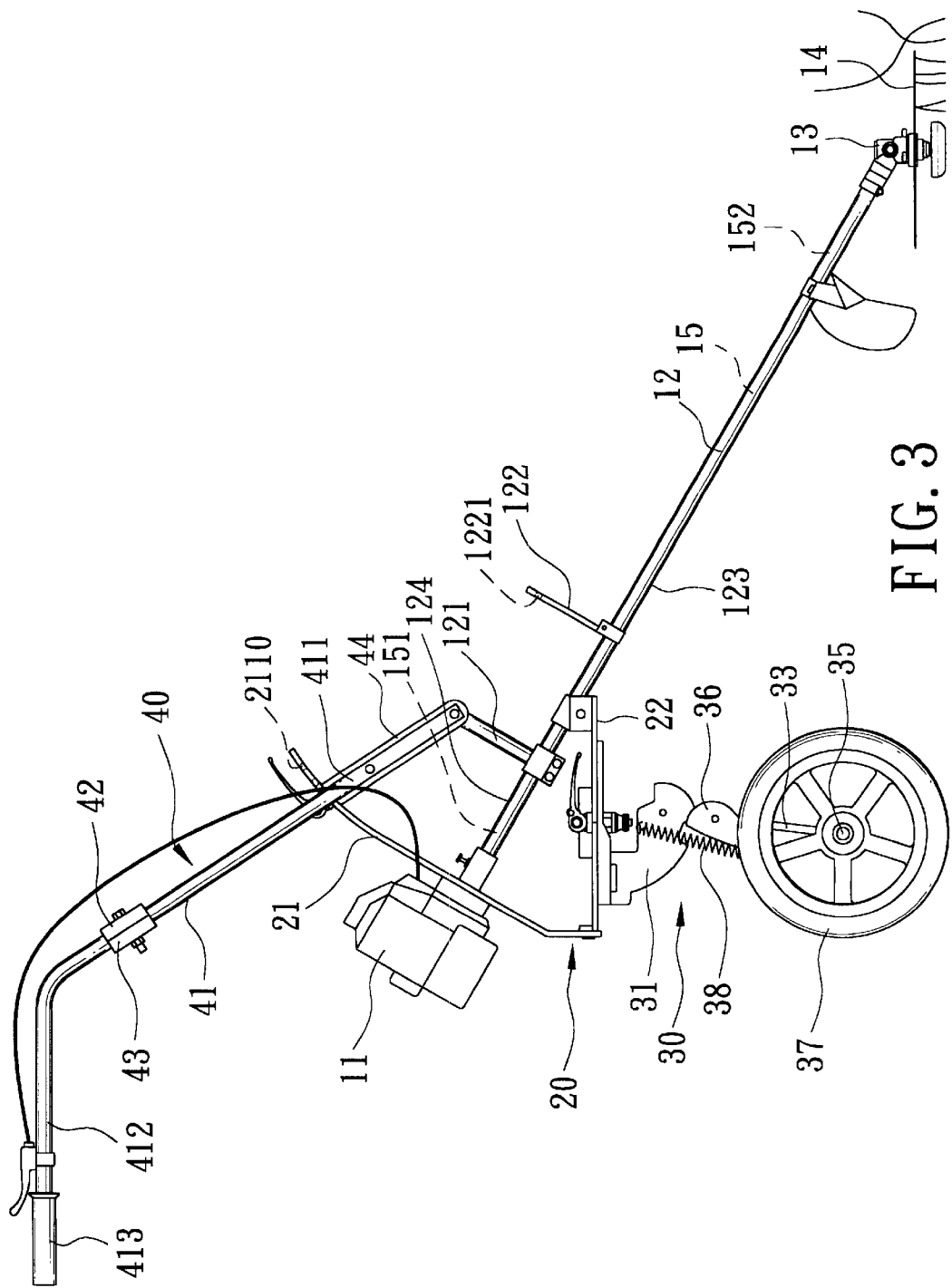
FIG. 3 is a side view of a preferred embodiment of a foldable power driven gardening device according to this invention with a handle member in an operating position.
Figure 4:
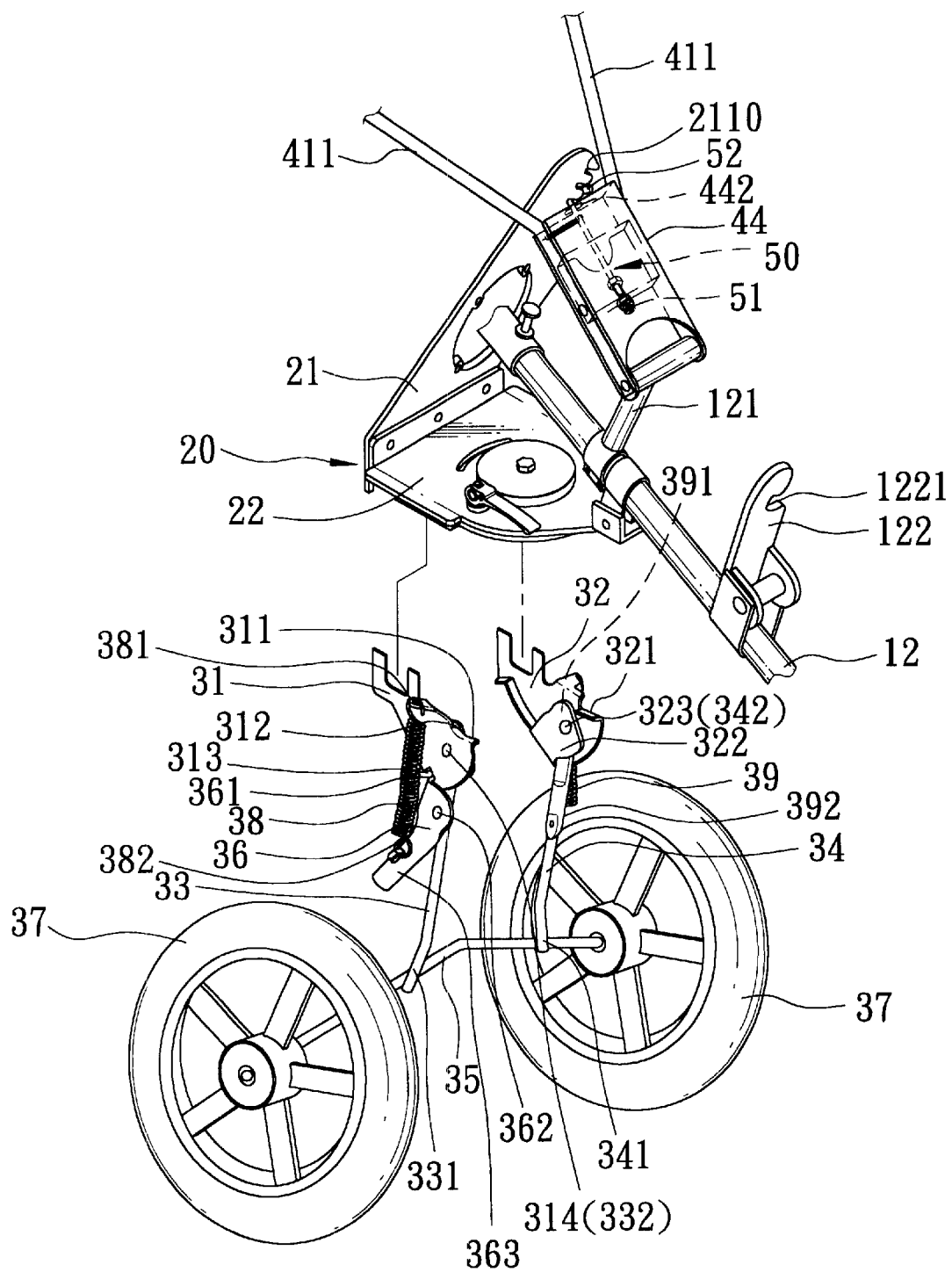
FIG. 4 is an exploded perspective view of a portion of the preferred embodiment.
Figure 5:
FIG. 5 is a schematic partly sectional view showing a mounting member of the preferred embodiment in a locking position.
Figure 5:
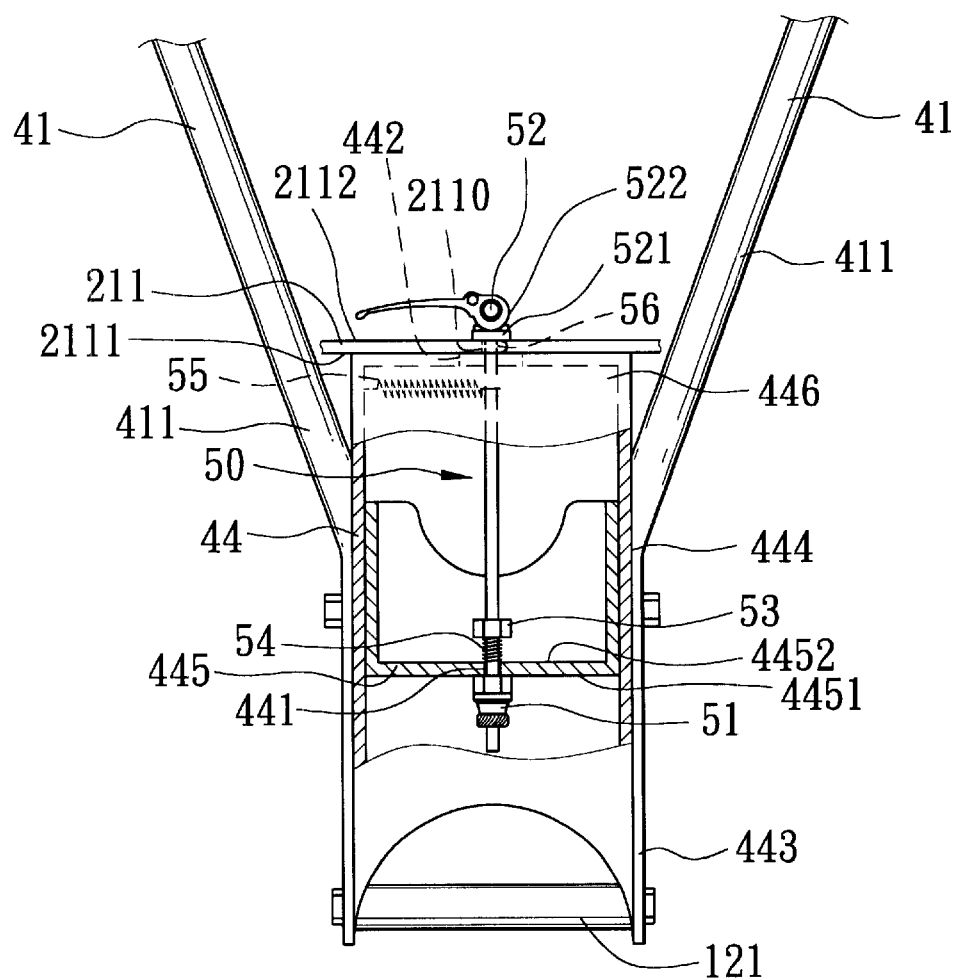

Referring to FIGS. 3, 4 and 5, the preferred embodiment of the foldable power driven gardening device according to the present invention is shown to comprise a wheel axle 35, a support member 20, a handle member 40, a mounting member 44, a first retaining member, and a second retaining member.

The wheel axle 35 extends in a first axis, and has two ends which are respectively provided with a pair of wheels 37 thereon.

The support member 20 includes a lower portion 22 which is secured relative to the wheel axle 35 between the wheels 37 by right and left seat frames 30, and an upper portion 21 which extends upwardly and in a first direction transverse to the first axis from the lower portion 22. A motor 11 has an output shaft (not shown), and is supported on the upper portion 21 of the support member 20. A coupling shaft 15 is mounted to be rotatable relative to the support member 20, and has a first rear end portion 151 which is coupled with and which is driven by the output shaft, and a first front end portion 152 which extends from the first rear end portion 151 in a second direction substantially transverse to both the first axis and the first direction, and which terminates at a coupling end 13. A sleeve mount member 12 is sleeved on the first rear end portion 151 of the coupling shaft 15 to permit rotation of the same relative thereto, and has a distal end portion 123 which is connected securely to the lower portion 22 of the support member 20, and a proximate end portion 124 which is disposed opposite to the distal end portion 123 in the second direction and which extends through the upper portion 21 of the support member 20. A tool member 14, such as a cutter, is mounted on and is driven by the coupling end 13.

Figure 7:
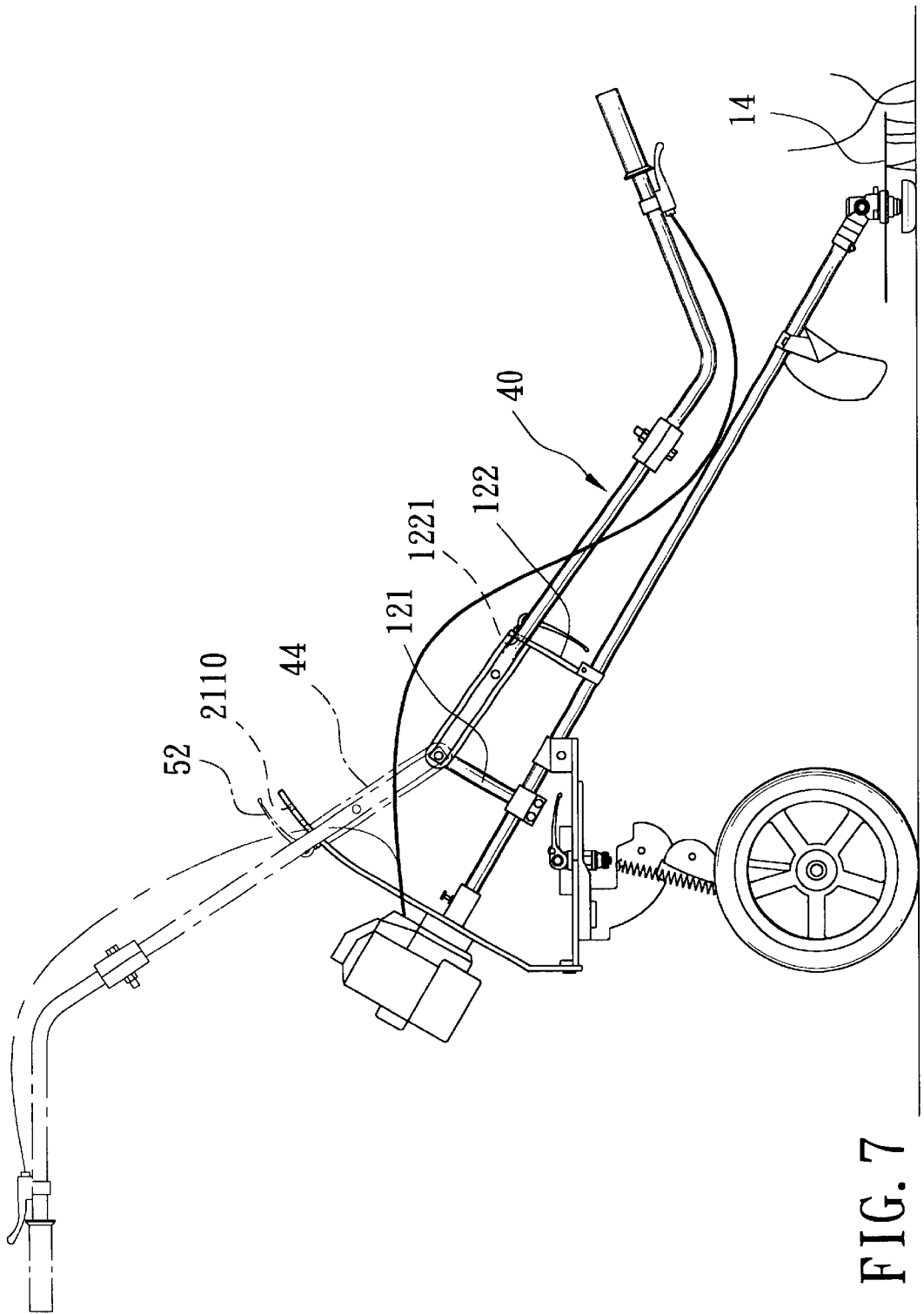
FIG. 7 is a side view of the preferred embodiment with the handle member in a folded position.

A T-shaped support post 121 has a lower end which is secured on the proximate end portion 124, and an upper end opposite to the lower end. The handle member 40 includes a pair of handlebars 41 which have second front end portions 411 that are pivoted to the upper end of the support post 121 about a second axis parallel to the first axis by the mounting member 44, and second rear end portions 412 that extend upwardly and rearwardly from the second front end portions 411 and that terminate at a handgrip end 413 extending rearwardly of the wheels 37. A pair of transverse rods 42,43 are secured on the second rear end portions 412. Thus, the second rear end portions 412 are turnable about the second axis between an operating position, where the handgrip end 413 is placed rearwardly of the wheels 37, as shown in FIG. 3, and a folded position, where the handgrip end 413 is placed forwardly of the wheels 37 and is proximate to the tool member 14, as shown in FIG. 7.

With reference to FIG. 5, the mounting member 44 is box-shaped, and includes a third front end portion 443 which is pivoted on the upper end of the support post 121 about the second axis, and a third rear end portion 444 which extends from the third front end portion 443 rearwardly and toward the upper portion 21 of the support member 20 and which is connected detachably to the second rear end portions 411 of the handlebars 41. The third rear end portion 444 has a front abutment wall 445 and a rear wall 446 which are proximate and distal to the third front end portion 443, respectively. The front abutment wall 445 has front and rear abutment surfaces 4451,4452 opposite to each other in a third direction. The front abutment surface 4451 defines a through hole 441 to communicate with the rear abutment surface 4452.

Figure 6:
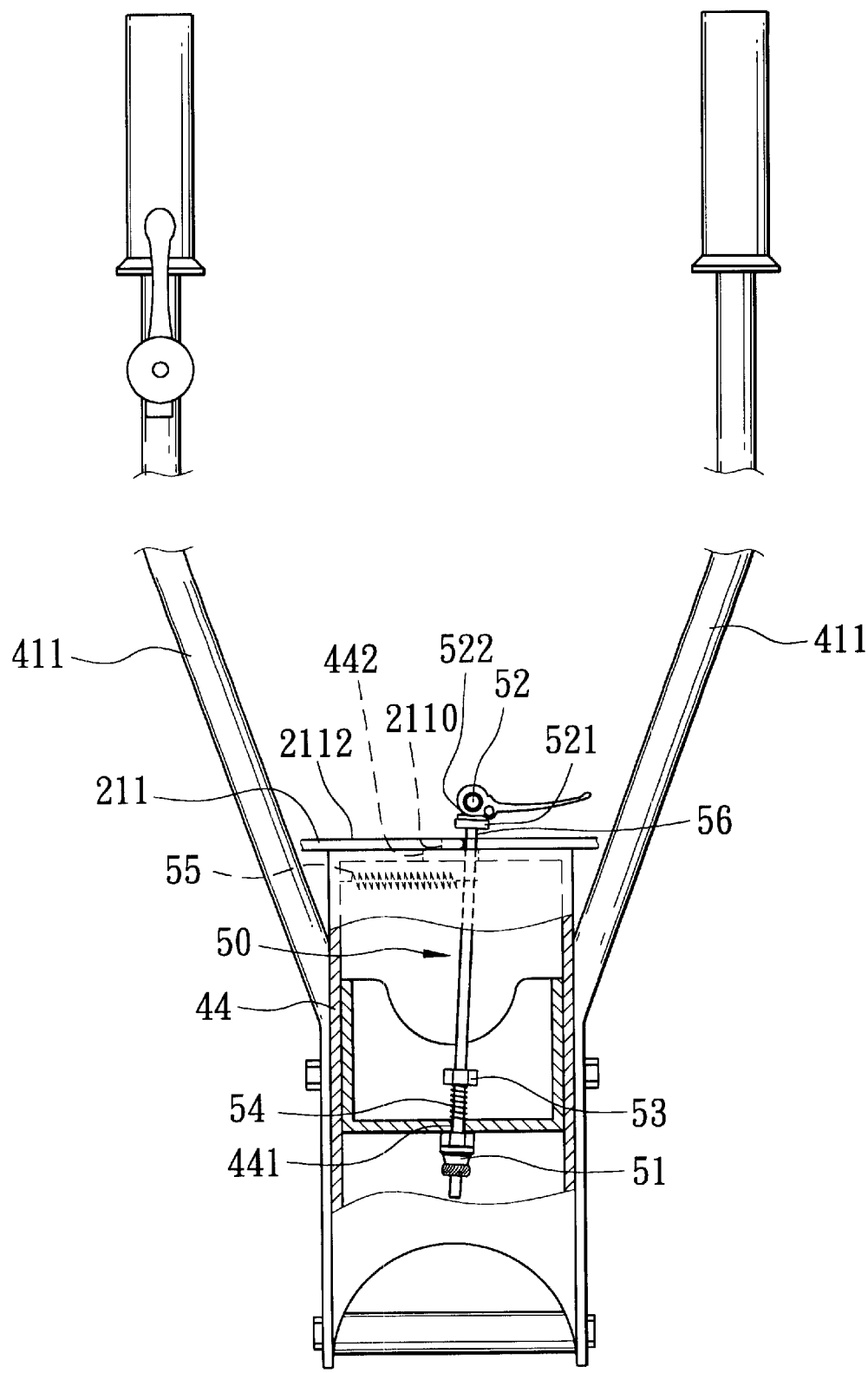
FIG. 6 is a schematic partly sectional view showing the mounting member in an unlocking position.

The first retaining member includes an anchored wall 211 which is integrally formed with the upper portion 21 and which is distal to the lower portion 22. The anchored wall 211 has front and rear anchored surfaces 2111,2112 opposite to each other. The front anchored surface 2111 faces spacedly the rear abutment surface 2112, and defines a retaining slot 2110 which extends to communicate with the rear anchored surface 2112. The retaining slot 2110 extends in a fourth direction transverse to the first direction. A tightening shaft 50 defines a third axis in the third direction, and is disposed to pass through the through hole 441 at a front shaft portion thereof, an elongate hole 442 in the rear wall 446, the retaining slot 2110, and a tightening block 521 at a rear shaft portion thereof to detachably interconnect the anchored wall 2112 and the third rear end portion 444. The front shaft portion is provided with an enlarged member 51 which loosely engages the front abutment surface 4451. The rear shaft portion has an actuated end 56 opposite to the enlarged member 51 in the third direction. A tightening member 52 has a cam surface 522, and is pivotally connected to the actuated end 56 to be turnable about a pivoting axis radial to the third axis between a tightened position, as shown in FIG. 5, where the cam surface 522 engages and abuts against the rear anchored surface 2112 to keep the actuated end 56 from moving towards the rear anchored surface 2112 such that the enlarged member 51 abuts against the front abutment surface 4451, and a loosened position, as shown in FIG. 6, where the cam surface 522 and the tightening block 521 are disengaged from the rear anchored surface 2112 so as to allow the actuated end 56 to move closer to the rear anchored surface 2112 and to the enlarged member 51 to loosely engage the front abutment surface 4451, thereby permitting the actuated end 56 to be moved out of the retaining slot 2110 in the fourth direction. Preferably, with reference to FIG. 4, the retaining slot 2110 includes a plurality of slot units which are spacedly displaced from one another in the first direction to engage the actuated end 56 selectively so as to adjust the height of the handgrip end 413.

A pushing block 53 is mounted on the tightening shaft 50, and is spaced apart from the rear abutment surface 4452. A first biasing member 54, such as a compression spring 54, is disposed between the pushing block 53 and the rear abutment surface 4452 to be compressed by the pushing block 53 when the cam surface 522 abuts against the rear anchored surface 2112, thereby resulting in an urging force to bias the actuated end 56 to move away from the rear anchored surface 2112. In addition, a second biasing member 55, such as a tension spring, is disposed between the tightening shaft 50 and a lateral wall of the third rear end portion 444 to bias the actuated end 56 toward the retaining slot 2110 in the fourth direction.

Therefore, by the action of the first retaining member, the second rear end portions 411 of the handlebars 41 can be retained relative to the upper portion 21 of the support member 20 when the second rear end portions 411 are in the operating position, as shown in FIG. 3.

In addition, the second retaining member includes a retaining plate 122 which is secured on the distal end portion 123 of the sleeve mount member 12 and which has a retaining slot 1221 so as to engage the actuated end 56 of the tightening shaft 50 therein to retain the handlebars 41 relative to the distal end portion 123 of the sleeve mount member 12, as shown in FIG. 7.

Figure 8:
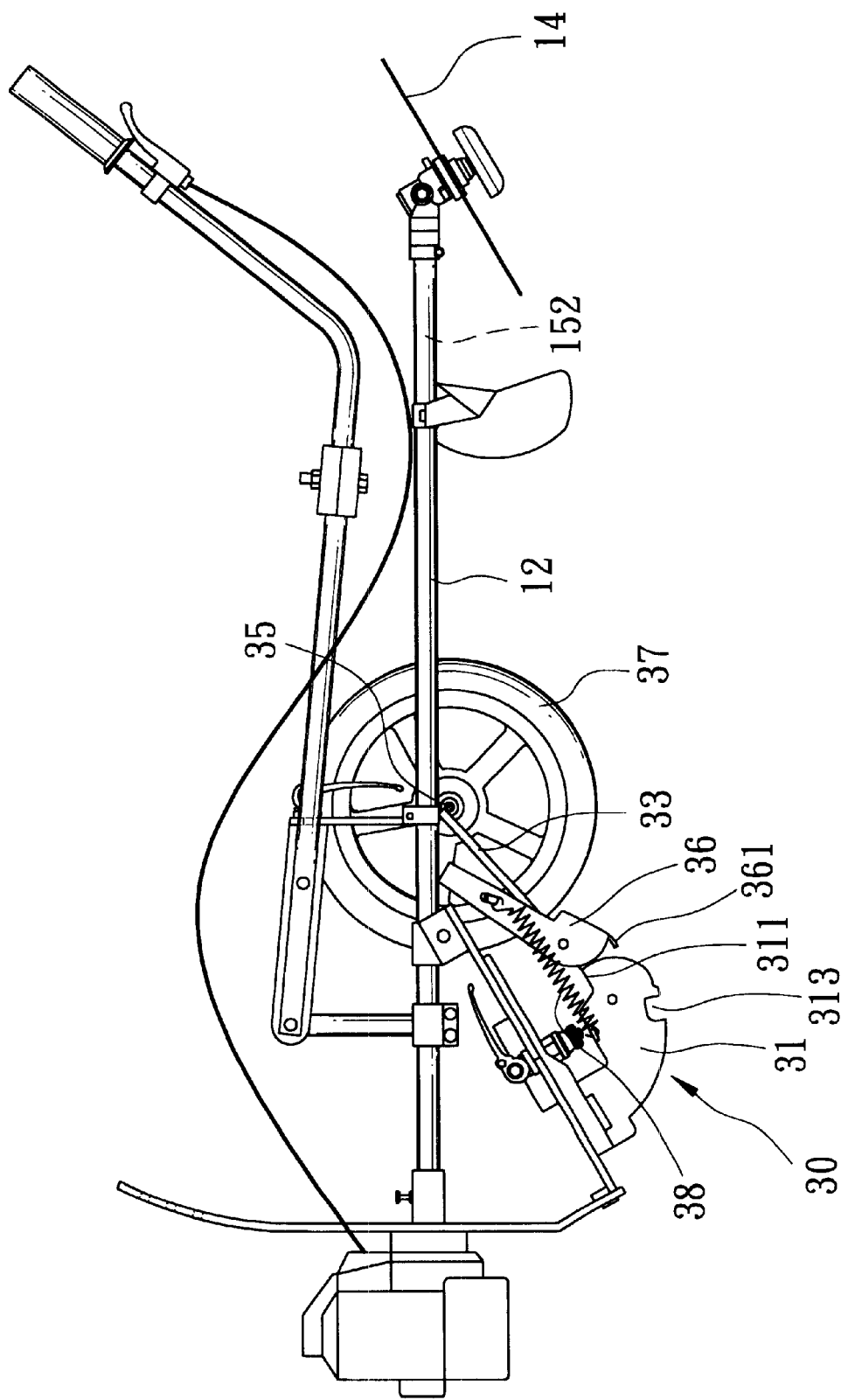
FIG. 8 is a side view of the preferred embodiment with the handle member and a wheel member in a folded state.

The right and left seat frames 30 respectively include right and left supporting portions 31,32 which hold the lower portion 22 of the support member 20, and which are spaced apart from each other in the fourth direction, and right and left pivoted portions 314,323 which are disposed respectively opposite to the right and left supporting portions 31,32 and distal to the lower portion 22. Right and left leg members 33,34 have right and left secured ends 331,341 which are connected to the wheel axle 35 and which are spaced apart from each other in the fourth direction, and right and left pivoted ends 332,342 which are pivotally connected to and which are turnable relative to the right and left pivoted portions 314,323 about first and second pivot axes in the fourth direction between a retracted position, as shown in FIG. 8, where the wheel axle 35 is closer to the first front end portion 152, and a position of use, as shown in FIG. 3, where the wheel axle 35 is remote from the first front end portion 152. First barriers 311,321 and second barriers 312,322 are disposed on the right and left seat frames 30 at the opposite sides of the first and second pivot axes to arrest the right and left pivoted ends 332,342 at the retracted position and the position of use, respectively.

Right and left tension springs 38,39 have connected ends 381,391 which are connected to the right and left supporting portions 31,32 at connected sites which are positioned at the opposite sides of the respective first or second axis relative to the respective right and left secured ends 331,341, and tensed ends 382,392 which are secured relative to the respective right and left secured ends 331,341. As such, the tensed ends 382,392 are movable between an arrested position corresponding to the position of use, as shown in FIG. 3, where the tensed ends 382,392 are positioned rearwardly of the respective right and left secured ends 331,341 while the tension springs 38,39 are tensed, and a released position, as shown in FIG. 8, where the tensed ends 382,392 are positioned forwardly of the respective right and left secured ends 331,341 while the tension springs 38,39 are tensed.

An actuating lever 36 has a pivotally mounted end 362 which is pivoted to the right leg member 33 proximate to and below the right pivoted end 332 around a pivotal axis, and a thrust end 363 which extends downwardly from the pivotally mounted end 362 to connect with the tensed end 382 of the right tension spring 38 so as to bring the tensed end 382 to either one of the arrested and released positions. The tensed state of the right tension spring 38 at the released position will help ease the movement of the wheel axle 35 towards the first front end portion 152.

A blocking member includes a notch 313 which is formed in the right pivoted portion 314, and an anchoring member 361 which is disposed on the pivotally mounted end 362 of the actuating lever 36 so as to resist the biasing action of the tension springs 38,39 when the tensed ends 382,392 are at the arrested position.

As illustrated, due to the foldable handle member 40 and the wheel axle 35 with the wheels 37, the gardening device of this invention can be conveniently stored. In addition, the handle member 40 is pivoted to the sleeve mount member 12 by the mounting member 44 using a quick-release construction, thereby rendering the retaining and releasing operations of the handle member 40 in the operating and folded positions convenient.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A foldable power driven gardening device comprising:
    a wheel axle extending in a first axis, and having two ends respectively provided with a pair of wheels thereon;
    a support member including a lower portion secured relative to said wheel axle between said wheels, and an upper portion extending upwardly and in a first direction transverse to the first axis from said lower portion;
    a motor with an output shaft and supported on said upper portion of said support member;
    a coupling shaft mounted to be rotatable relative to said support member, and having a first rear end portion coupled with and driven by said output shaft, and a first front end portion extending from said first rear end portion in a second direction substantially transverse to both the first axis and the first direction, and terminating at a coupling end;
    a sleeve mount member sleeved on said first rear end portion to permit rotation of said first rear end portion relative thereto, and having a distal end portion which is connected securely to said support member, and a proximate end portion opposite to said distal end portion in the second direction;
    a tool member mounted on and driven by said coupling end;
    a handle member having a second front end portion secured to be pivotable relative to said proximate end portion of said sleeve mount member about a second axis parallel to the first axis, and a second rear end portion extending upwardly and rearwardly from said second front end portion and terminating at a handgrip end which extends rearwardly of said wheels, said second rear end portion being turnable about the second axis between an operating position, where said handgrip end is placed rearwardly of said wheels, and a folded position, where said handgrip end is placed forwardly of said wheels and is proximate to said coupling end of said coupling shaft; and
    a first retaining member disposed to retain said upper portion of said support member relative to said second rear end portion of said handle member when said second rear end portion is in the operating position.

2. The foldable power driven gardening device of claim 1, further comprising a mounting member including a third front end portion which is secured to be pivotable relative to said proximate end portion about the second axis, and a third rear end portion which extends from said third front end portion rearwardly and toward said upper portion and which is connected detachably to said second rear end portion of said handle member.

3. The foldable power driven gardening device of claim 2, wherein said third rear end portion has a front abutment wall which is proximate to said third front end portion, said front abutment wall having front and rear abutment surfaces opposite to each other in a third direction, said front abutment surface defining a through hole to communicate with said rear abutment surface,
    said first retaining member including
        an anchored wall disposed to be integrally formed with said upper portion and distal to said lower portion, said anchored wall having front and rear anchored surfaces opposite to each other, said front anchored surface spacedly facing said rear abutment surface, and defining a retaining slot which extends to communicate with said rear anchored surface, and
        a tightening shaft defining a third axis in the third direction, and disposed to pass through said through hole and said retaining slot and detachably interconnect said anchored wall and said front abutment wall.

4. The foldable power driven gardening device of claim 3, wherein said tightening shaft includes an enlarged end extending forwardly of, and loosely engaging said front abutment surface, and an actuated end opposite to said enlarged end in the third direction, said actuated end being disposed to extend rearwardly of and being movable relative to said front anchored surface in the third direction between a tightened position, where said actuated end is kept from moving towards said rear anchored surface while said enlarged end abuts against said front abutment surface, and a loosened position, where said actuated end is closer to said rear anchored surface while said enlarged end loosely engages said front abutment surface.

5. The foldable power driven gardening device of claim 4, wherein said first retaining member further includes a tightening member which has a cam surface and which is pivotally connected to said actuated end to be turnable about a pivoting axis that is radial to the third axis between the tightened position, where said cam surface engages and abuts against said rear anchored surface to keep said actuated end from moving towards said rear anchored surface, and the loosened position, where said cam surface is disengaged from said rear anchored surface so as to allow said actuated end to move closer to said rear anchored surface.

6. The foldable power driven gardening device of claim 5, wherein said first retaining member further includes a first biasing member disposed to bias said actuated end to move away from said rear anchored surface.

7. The foldable power driven gardening device of claim 6, wherein said first retaining member further includes a pushing block mounted on said tightening shaft and spaced apart from said rear abutment surface, said first biasing member being a compression spring disposed between said pushing block and said rear abutment surface so as to be compressed by said pushing block when said cam surface abuts against said rear anchored surface.

8. The foldable power driven gardening device of claim 7, wherein said retaining slot extends in a fourth direction transverse to the first direction such that said actuated end is movable out of said retaining slot in the fourth direction.

9. The foldable power driven gardening device of claim 8, further comprising a second biasing member disposed to bias said actuated end toward said retaining slot in the fourth direction.

10. The foldable power driven gardening device of claim 9, wherein said retaining slot includes a plurality of slot units spacedly displaced from one another in the first direction to engage said actuated end selectively so as to adjust the height of said handgrip end.

11. The foldable power driven gardening device of claim 3, wherein said proximate end portion is connected securely to said upper portion at a position between said anchored wall and said lower portion.

12. The foldable power driven gardening device of claim 11, further comprising a support post which has a lower end securely mounted on said proximate end portion, and an upper end pivotally connected to said third front end portion so as to permit said third front end portion to turn about the second axis.

13. The foldable power driven gardening device of claim 1, further comprising a second retaining member disposed to retain said second rear end portion on said distal end portion of said sleeve mount member.

14. The foldable power driven gardening device of claim 1, further comprising:

right and left seat frames which respectively include
    right and left supporting portions holding said lower portion of said support member, and spaced apart from each other in a fourth direction parallel to the first axis, and right and left pivoted portions respectively opposite to said right and left supporting portions and distal to said lower portion, and
    right and left leg members having right and left secured ends which are connected to said wheel axle and which are spaced apart from each other in the fourth direction, and right and left pivoted ends which are pivotally connected to and which are turnable relative to said right and left pivoted portions about first and second pivot axes in the fourth direction between a retracted position, where said wheel axle is closer to said first front end portion, and a position of use, where said wheel axle is remote from said first front end portion;

first and second barriers disposed on at least one of said right and left seat frames at the opposite sides of a respective one of said first and second pivot axes to arrest a respective one of said right and left pivoted ends at the retracted position and the position of use, respectively; and a tension spring having a connected end connected to one of said right and left supporting portions at a respective connected site which is positioned at the opposite side of the respective one of said first and second axes relative to the respective one of said right and left secured ends, and a tensed end secured relative to the respective one of said right and left secured ends and movable between an arrested position corresponding to the position of use, where said tensed end is positioned rearwardly of the respective one of said right and left secured ends while said tension spring is tensed, and a released position, where said tensed end is positioned forwardly of the respective one of said right and left secured ends while said tension spring is tensed; and an actuating lever having a pivotally mounted end which is pivoted to a respective one of said right and left leg members proximate to and below the respective one of said right and left pivoted ends around a pivotal axis, and a thrust end which extends downwardly from said pivotally mounted end to connect with said tensed end so as to bring said tensed end to either one of the arrested and released positions;

whereby the tensed state of said tension spring at the released position will help ease the movement of said wheel axle towards said first front end portion.

15. The foldable power driven gardening device of claim 14, further comprising a blocking member disposed on the respective one of said right and left pivoted portions to resist biasing action of said tension spring when said tensed end is at the arrested position.

* * * * *